United States Patent
Sesing et al.

(10) Patent No.: US 7,819,949 B2
(45) Date of Patent: Oct. 26, 2010

(54) PROCESS FOR EXTRACTING (CHLORINATED) HYDROCARBON-FREE HYDROGEN CHLORIDE AND PHOSGENE-FREE (CHLORINATED) HYDROCARBONS FROM A HYDROGEN CHLORIDE STREAM CONTAINING (CHLORINATED) HYDROCARBONS AND PHOSGENE

(75) Inventors: Martin Sesing, Waldsee (DE); Heiner Schelling, Kirchheim (DE); Juergen Ciprian, Ludwigshafen (DE); Filip Deberdt, Muizen (BE); Martin Karches, Neustadt (DE); Olga Schubert, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 288 days.

(21) Appl. No.: 12/159,797

(22) PCT Filed: Jan. 25, 2007

(86) PCT No.: PCT/EP2007/050716

§ 371 (c)(1),
(2), (4) Date: Jul. 1, 2008

(87) PCT Pub. No.: WO2007/085627

PCT Pub. Date: Aug. 2, 2007

(65) Prior Publication Data

US 2008/0295688 A1    Dec. 4, 2008

(30) Foreign Application Priority Data

Jan. 27, 2006    (EP) ................................. 06100960

(51) Int. Cl.
*B01D 53/70* (2006.01)
*C01B 7/07* (2006.01)

(52) U.S. Cl. ............................ 95/115; 95/142; 423/488
(58) Field of Classification Search .................. 95/114, 95/115, 142, 148; 423/240 S, 240 R, 245.1, 423/481, 488
See application file for complete search history.

(56) References Cited

U.S. PATENT DOCUMENTS 5,126,119 A * 6/1992 Freyer et al. ............ 423/240 R (Continued)

FOREIGN PATENT DOCUMENTS

DE    102 34 908 A1    2/2004

(Continued)

OTHER PUBLICATIONS

Chemical Abstracts+Indexes, American Chemical Society, 116, No. 12, XP-000255954, Mar. 23, 1992, p. 195.

*Primary Examiner*—Frank M Lawrence
(74) *Attorney, Agent, or Firm*—Oblon, Spivak, McClelland, Maier & Neustadt, L.L.P.

(57) ABSTRACT

(Chloro)hydrocarbon-free hydrogen chloride and phosgene-free (chloro)hydrocarbons are recovered from a hydrogen chloride stream having (chloro)hydrocarbons and phosgene. The recovery involves connecting a first adsorber and a second adsorber in series and passing the fresh hydrogen chloride stream comprising phosgene and (chloro)hydrocarbons firstly through the first adsorber and subsequently through the second adsorber until essentially no more (chloro)hydrocarbon is adsorbed by the first adsorber, passing the fresh hydrogen chloride stream through the second adsorber while the first adsorber is regenerated, with essentially phosgene-free (chloro)hydrocarbon being obtained in the regeneration, passing the fresh hydrogen chloride stream firstly through the second adsorber and subsequently through the regenerated first adsorber until essentially no more (chloro)hydrocarbon is adsorbed by the second adsorber, and passing the fresh hydrogen chloride stream through the first adsorber while the second adsorber is regenerated, with essentially phosgene-free (chloro)hydrocarbon being obtained in the regeneration.

7 Claims, 6 Drawing Sheets

| U.S. PATENT DOCUMENTS | | | |
|---|---|---|---|
| 2008/0159948 A1 * | 7/2008 | Sesing et al. | 423/502 |
| 2008/0264253 A1 * | 10/2008 | Brettschneider et al. | 95/96 |

FOREIGN PATENT DOCUMENTS

| GB | 196258 | 2/1924 |
|---|---|---|
| JP | 10-120402 A * | 5/1998 |
| WO | WO 94/16988 | 8/1994 |

\* cited by examiner

PROCESS FOR EXTRACTING (CHLORINATED) HYDROCARBON-FREE HYDROGEN CHLORIDE AND PHOSGENE-FREE (CHLORINATED) HYDROCARBONS FROM A HYDROGEN CHLORIDE STREAM CONTAINING (CHLORINATED) HYDROCARBONS AND PHOSGENE

The invention relates to a process for recovering (chloro) hydrocarbon-free hydrogen chloride and phosgene-free (chloro)hydrocarbons from a hydrogen chloride stream comprising (chloro)hydrocarbons and phosgene.

In the process developed by Deacon in 1868 for the catalytic oxidation of hydrogen chloride, hydrogen chloride is oxidized to chlorine by means of oxygen in an exothermic equilibrium reaction. The conversion of hydrogen chloride into chlorine enables chlorine production to be decoupled from the production of sodium hydroxide by chloralkali electrolysis. Such decoupling is attractive since the world demand for chlorine is growing more quickly than the demand for sodium hydroxide. In addition, hydrogen chloride is obtained in large quantities as coproduct in, for example, phosgenation reactions, for instance in isocyanate production. The hydrogen chloride formed in isocyanate production is mostly used in the oxychlorination of ethylene to 1,2-dichloroethane, which is processed further to vinyl chloride and finally to PVC.

The HCl-comprising feed gas stream fed into the catalytic oxidation of hydrogen chloride is usually an HCl-comprising stream which is obtained as offgas stream in a process in which hydrogen chloride is formed as coproduct. Such processes are, for example, (1) the preparation of isocyanates from phosgene and amines,
(2) the preparation of acid chloride,
(3) the preparation of polycarbonate,
(4) the preparation of vinyl chloride from ethylene dichloride,
(5) the chlorination of aromatics.

The HCl-comprising feed gas stream generally comprises secondary constituents. It usually comprises water-insoluble impurities which can be either organic or inorganic in nature. Organic impurities are, for example, hydrocarbons or chlorohydrocarbons.

Typical hydrocarbons which can be comprised in the HCl-comprising feed gas streams comprise aromatics such as benzene, toluene, xylenes and $C_6$-$C_{12}$-aliphatics. Typical chlorohydrocarbons are monochlorobenzene, dichlorobenzene, carbon tetrachloride, vinyl chloride and dichloroethane. The hydrocarbons and chlorohydrocarbons can be comprised in amounts of up to 20% by volume, generally up to 30000 ppm, preferably in amount up to 10000 ppm and in particular in amounts of from 100 to 3000 ppm. As inorganic secondary constituent, phosgene, in particular, can be comprised in the HCl-comprising feed gas streams which originate from the processes (1), (2) and (3).

In general, the HCl-comprising feed stream is prepurified over a guard bed by passing it over the guard bed and adsorbing hydrocarbons comprised therein before it is introduced into the hydrogen chloride oxidation. The guard bed comprises suitable adsorbents, preferably in particulate form, e.g. spheres, extrudates or pellets. Suitable materials which can be used as adsorbents are, for example, activated carbon, aluminum oxide, titanium oxide, silicon dioxide, iron oxide, zeolites and molecular sieves. Suitable materials may also comprise metal oxides or metal halides, e.g. copper or ruthenium oxides or halides or mixtures thereof, on a support composed of a refractory inorganic material such as aluminum oxide, titanium oxide or silicon dioxide. Preferred adsorbents are aluminum oxide, activated carbon, doped activated carbon and aluminas.

A disadvantage of the processes of the prior art is that the (chloro)hydrocarbons recovered by adsorption from the hydrogen chloride offgas streams from the abovementioned processes (1), (2) and (3) are contaminated with phosgene.

It is an object of the invention to provide a process in which the (chloro)hydrocarbons comprised together with phosgene in the HCl-comprising feed gas stream to the hydrogen chloride oxidation are removed from the feed gas stream and are recovered in essentially phosgene-free form.

This object is achieved by a process for recovering (chloro) hydrocarbon-free hydrogen chloride and essentially phosgene-free (chloro)hydrocarbons from a hydrogen chloride stream comprising the (chloro)hydrocarbons and phosgene, which comprises i) in a first step, connecting a first adsorber and a second adsorber in series and passing the fresh hydrogen chloride stream comprising phosgene and (chloro)hydrocarbons firstly through the first adsorber and subsequently through the second adsorber until essentially no more (chloro)hydrocarbon is adsorbed by the first adsorber, ii) in a second step, passing the fresh hydrogen chloride stream through the second adsorber while the first adsorber is regenerated, with essentially phosgene-free (chloro)hydrocarbon being obtained in the regeneration, iii) in a third step, passing the fresh hydrogen chloride steam firstly through the second adsorber and subsequently through the regenerated first adsorber until essentially no more (chloro)hydrocarbon is adsorbed by the second adsorber, iv) in a fourth step, passing the fresh hydrogen chloride stream through the first adsorber while the second adsorber is regenerated, with essentially phosgene-free (chloro)hydrocarbon being obtained in the regeneration, with the steps i) to iv) being able to be carried out one or more times in succession.

Figure 1:
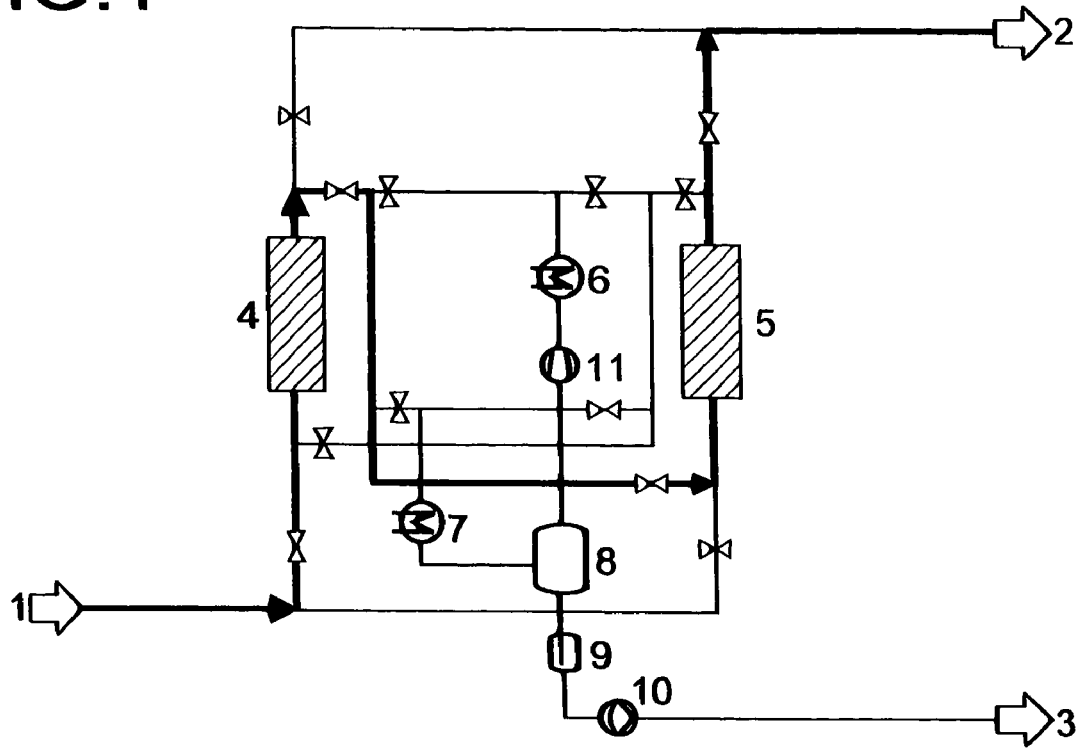
FIG. 1 illustrates step i) of the process of the invention.

The invention makes use of the fact that (chloro)hydrocarbons are adsorbed better by customary adsorbents than is phosgene. Thus, as the loading of the adsorber bed with (chloro)hydrocarbons increases, previously adsorbed phosgene is displaced from the adsorber bed. The displaced phosgene is trapped by a downstream adsorber bed or goes into the downstream process, for example the catalytic oxidation of hydrogen chloride. When essentially no more (chloro)hydrocarbon is adsorbed by the adsorber, it is fully laden with (chloro)hydrocarbon and there is consequently no longer any phosgene present on the adsorber bed. Full loading of the adsorber bed is determined by means of suitable probes. Particular preference is given to spectroscopic methods such as infrared spectrometry or UV spectrometry or chromatographic methods such as gas chromatography. The adsorbed (chloro)hydrocarbon can subsequently be recovered by regeneration of the adsorber bed and is obtained in phosgene-free form.

Preferred adsorbents used in the process of the invention are activated carbon, doped activated carbons, aluminum oxides and aluminas.

(Chloro)hydrocarbons which are comprised in the hydrogen chloride streams used according to the invention and are recovered are preferably monochlorobenzene, dichlorobenzene and toluene.

Phosgene is generally comprised in the hydrogen chloride stream in amounts of 5-20000 ppm, preferably 20-5000 ppm, particularly preferably 50-2000 ppm.

The (chloro)hydrocarbons recovered in the regeneration steps (ii) and (iv) generally comprise <5000 ppm, preferably <1000 ppm, of phosgene.

Apart from (chloro)hydrocarbons and phosgene, the fresh hydrogen chloride stream can further comprise carbon monoxide, carbon dioxide, inert gases, compressor oils or other lubricants as are used, for example, for dynamic seals.

In an embodiment of the process of the invention, the hydrogen chloride comprised in the respective adsorber is passed as circulating gas in a closed circuit comprising a compressor, a heater, a condenser and a phase separator over the adsorber bed in the regeneration steps ii) and/or iv), with the circulating hydrogen chloride gas stream being heated before it enters the adsorber bed and being cooled after it leaves the adsorber bed, with liquid, essentially phosgene-free chlorohydrocarbon being recovered in the condenser and phase separator.

The regeneration step ii) or iv) is particularly preferably carried out in two substeps with the circulating hydrogen chloride gas stream being heated before it enters the adsorber bed and being cooled after it leaves the adsorber bed in a first substep iia) or iva) and the circulating hydrogen chloride gas stream only being cooled in a second substep iib) or ivb). The essentially phosgene-free (chloro)hydrocarbon is obtained in the cooler/condenser and phase separator. In this way, the adsorption bed is cooled before the adsorber changes back from regeneration operation to adsorption operation. Here, the circulating gas stream is preferably passed over the adsorption bed in the same direction as in the adsorption step i) or iii).

In the regeneration steps iia) and/or iva), the circulating gas stream is preferably passed over the adsorption bed in the opposite direction compared to the adsorption step i) or iii).

It is particularly preferred to reverse the direction of the circulating gas again between the steps iia) and iib) or iva) and ivb). The direction of the gas stream thus once again corresponds to the original direction of the gas stream during adsorption operation.

The repeated reversal of the gas direction is preferred for the following reason: during the first substep, the circulating gas flows through the adsorber in the direction opposite to that during the preceding loading step. This prevents any strongly adsorbing components, e.g. compressor oils or lubricants, comprised in the crude gas from being carried from the start of the adsorber bed into the bed during desorption. The reversal of the flow direction thus acts, so to speak, as backflushing. In the second substep, viz, the cooling of the bed, the flow direction of the circulating gas is reversed; this is the same as in the active loading of the bed by the crude gas to be purified. (Chloro)hydrocarbon is also still comprised in the cold circulating gas in an amount corresponding to its vapor pressure. This is adsorbed by the adsorbent during the cooling phase. As a result of the reversal of the flow direction during cooling, the (chloro)hydrocarbon is adsorbed at the entrance to the bed and not at the outlet from the bed.

In a further embodiment of the process of the invention, the regeneration step ii) or iv) is carried out using fresh gas instead of circulating gas. For this purpose, a substream of the fresh hydrogen chloride stream or even the entire fresh hydrogen chloride stream is, in the regeneration steps ii) and/or iv), branched off, heated, passed through the adsorber bed to be regenerated and subsequently passed through a condenser and a phase separator, with liquid, essentially phosgene-free (chloro)hydrocarbon being recovered, and this stream is subsequently recombined with the main stream of the fresh hydrogen chloride and passed through the other adsorber which is in adsorption operation.

Here too, the regeneration step ii) or iv) is preferably carried out in two substeps, with the substream being heated before it enters the adsorber bed and being cooled after leaving the adsorber bed in a first substep iia) or iva) and the substream no longer being heated in a second step iib) or ivb). The essentially phosgene-free (chloro)hydrocarbon is obtained in the cooler/condenser and phase separator. Here too, the gas direction is preferably reversed between the steps i) and iia) or iii) and iva) and reversed again between the steps iia) and iib) or iva) and ivb).

In adsorption operation, the adsorbers are generally operated at a temperature of from 0 to 60° C., preferably from 20 to 40° C. The hydrogen chloride passed over the adsorption bed in regeneration operation generally has a temperature of from 100 to 250° C., preferably from 120 to 200° C. The hydrogen chloride stream is generally cooled to a temperature in the range from −25 to 40° C., preferably from 20 to 40° C., in the cooler/condenser.

The hydrogen chloride stream which has been freed of (chloro)hydrocarbons can be used as feed gas stream in downstream processes in which hydrogen chloride is used as starting material. Examples are the catalytic oxidation of hydrogen chloride or the oxychlorination of ethene for the preparation of ethylene dichloride.

The (chloro)hydrocarbon-free hydrogen chloride stream obtained according to the invention is preferably used for preparing chlorine by catalytic oxidation of hydrogen chloride.

The invention also provides a process for preparing chlorine from hydrogen chloride comprising (chloro)hydrocarbons and phosgene, which comprises the steps:

a) purification of a stream a comprising hydrogen chloride, (chloro)hydrocarbons and phosgene by the process of the invention to give phosgene-free (chloro)hydrocarbons and an essentially (chloro)hydrocarbon-free, HCl-comprising feed gas stream b1;

b) introduction of the HCl-comprising stream b1 and an oxygen-comprising stream b2 into an oxidation zone and catalytic oxidation of hydrogen chloride to chlorine to give a product gas stream b3 comprising chlorine, water, oxygen, hydrogen chloride, carbon dioxide and inert gases;

c) contacting of the product gas stream b3 with aqueous hydrochloric acid I in a phase contact apparatus and partial removal of water and hydrogen chloride from the stream b3 to leave a gas stream c comprising hydrogen chloride, chlorine, water, oxygen, carbon dioxide and possibly inert gases, with at least 5% of the hydrogen chloride comprised in the stream b3 remaining in the gas stream c;

d) drying of the gas stream c to leave an essentially water-free gas stream d comprising hydrogen chloride, chlorine, oxygen, carbon dioxide and possibly inert gases;

e) partial liquefaction of the gas stream d by compression and cooling to give an at least partially liquefied stream e;

f) gas/liquid separation of the stream e to give a gas stream f1 comprising chlorine, oxygen, carbon dioxide and possibly inert gases and a liquid stream f2 comprising hydrogen chloride, chlorine, oxygen and carbon dioxide and, if appropriate, recirculation of at least part of the gas stream f1 to step b);

g) separation of the liquid stream f2 by distillation in a column to give a chlorine stream g1 and a stream g2 consisting essentially of hydrogen chloride, oxygen and carbon dioxide, with part of the hydrogen chloride condensing at the top of the column and running back as runback into the column, as a result of which a stream g2 having a chlorine content of <1% by weight is obtained.

A preferred variant of the downstream hydrogen chloride oxidation is described in detail below.

In the oxidation step b), the HCl-comprising steam b1 is fed together with an oxygen-comprising stream b2 into an oxidation zone and is catalytically oxidized.

In the catalytic process also known as the Deacon process, hydrogen chloride is oxidized to chlorine by means of oxygen in an exothermic equilibrium reaction, with water vapor being formed. Customary reaction temperatures are in the range from 150 to 500° C., and customary reaction pressures are in the range from 1 to 25 bar. Furthermore, it is advantageous to use oxygen in superstoichiometric amounts. It is customary to use, for example, a from two-fold to four-fold excess of oxygen. Since no decreases in selectivity have to be feared, it can be economically advantageous to work at relatively high pressures and accordingly at residence times longer than those at atmospheric pressure.

Suitable catalysts comprise, for example, ruthenium oxide, ruthenium chloride or other ruthenium compounds on silicon dioxide, aluminum oxide, titanium dioxide or zirconium dioxide as support. Suitable catalysts can, for example, be obtained by application of ruthenium chloride to the support and subsequent drying or drying and calcination. Suitable catalyst can also comprise, in addition to or in place of a ruthenium compound, compounds of other noble metals, for example gold, palladium, platinum, osmium, iridium, silver, copper or rhenium. Suitable catalysts can also comprise chromium(III) oxide.

Further suitable catalysts are ones which comprise, on a support, from 0.001 to 30% by weight of gold, from 0 to 3% by weight of one or more alkaline earth metals, from 0 to 3% by weight of one or more alkali metals, from 0 to 10% by weight of one or more rare earth metals and from 0 to 10% by weight of one or more further metals selected from the group consisting of ruthenium, palladium, platinum, osmium, iridium, silver, copper and rhenium, in each case based on the total weight of the catalyst.

Such gold-comprising supported catalysts have, in particular at temperatures of $\leq 250°$ C., a higher activity in the oxidation of hydrogen chloride than the ruthenium-comprising catalysts of the prior art.

Customary reaction apparatuses in which the catalytic oxidation of hydrogen chloride is carried out are fixed-bed or fluidized-bed reactors. The hydrogen chloride oxidation can be carried out in a plurality of stages.

The catalytic oxidation of hydrogen chloride can be carried out adiabatically or preferably isothermally or approximately isothermally, batchwise, preferably continuously, as a fluidized-bed or fixed-bed process. It is preferably carried out in a fluidized-bed reactor at a temperature of from 320 to 400° C. and a pressure of from 2-8 bar.

In isothermal or approximately isothermal operation, it is also possible to use a plurality of reactors, i.e. from 2 to 10 reactors, preferably from 2 to 6 reactors, particularly preferably from 2 to 5 reactors, in particular 2 or 3 reactors, connected in series with additional intermediate cooling. The oxygen can either all be added together with the hydrogen chloride upstream of the first reactor or its addition can be distributed over the various reactors. This series arrangement of individual reactors can also be effected in a single apparatus.

In one embodiment, a structured catalyst bed in which the catalyst activity increases in the flow direction is used in the fixed-bed reactor. Such structuring of the catalyst bed can be achieved by different impregnation of the catalyst supports with active composition or by different dilution of the catalyst with an inert material. As inert material, it is possible to use, for example, rings, cylinders or spheres composed of titanium dioxide, zirconium dioxide or mixtures thereof, aluminum oxide, steatite, ceramic, glass, graphite or stainless steel. In the case of the preferred use of shaped catalyst bodies, the inert material should preferably have similar external dimensions. Suitable shaped catalyst bodies can have any shapes, with preference being given to pellets, rings, cylinders, stars, wagon wheels or spheres, particularly preferably rings, cylinders or star extrudates.

Suitable heterogeneous catalysts are, in particular, ruthenium compounds or copper compounds on support materials, and these may also be doped. Preference is given to doped or undoped ruthenium catalysts. Suitable support materials are, for example, silicon dioxide, graphite, titanium dioxide having a rutile or anatase structure, zirconium dioxide, aluminum oxide or mixtures thereof, preferably titanium dioxide, zirconium dioxide, aluminum oxide or mixtures thereof, particularly preferably gamma- or alpha-aluminum oxide or mixtures thereof.

The supported copper or ruthenium catalysts can be obtained, for example, by impregnation of the support material with aqueous solutions of $CuCl_2$ or $RuCl_3$ and, if appropriate, a promoter for doping, preferably in the form of their chlorides. The shaping of the catalyst can be carried out after or preferably before impregnation of the support material.

Promoters suitable for doping are alkali metals such as lithium, sodium, potassium, rubidium and cesium, preferably lithium, sodium and potassium, particularly preferably potassium, alkaline earth metals such as magnesium, calcium, strontium and barium, preferably magnesium and calcium, particularly preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof.

The shaped bodies can subsequently be dried and if appropriate calcined at temperatures of from 100 to 500° C., preferably from 100 to 400° C., for example under a nitrogen, argon or air atmosphere. The shaped bodies are preferably firstly dried at from 100 to 200° C. and subsequently calcined at from 200 to 400° C. The volume ratio of hydrogen chloride to oxygen at the reactor inlet is generally from 1:1 to 20:1, preferably from 2:1 to 8:1, particularly preferably from 2:1 to 5:1.

In a step c), the product gas stream b3 is brought into contact with aqueous hydrochloric acid I in a phase contact apparatus and water and hydrogen chloride are partly separated off from the stream b3 to leave a gas stream c comprising hydrogen chloride, chlorine, water, oxygen, carbon dioxide and possibly inert gases. In this step, which can also be referred to as quenching and absorption step, the product gas stream b3 is cooled and water and hydrogen chloride are partly separated off from the product gas stream b3 as aqueous hydrochloric acid. The hot product gas stream b3 is cooled by bringing it into contact with dilute hydrochloric acid I as quenching medium in a suitable phase contact apparatus, for example a packed or tray column, a jet scrubber or a spray tower, with part of the hydrogen chloride being absorbed in the quenching medium. The quenching and absorption medium is dilute hydrochloric acid which is not saturated with hydrogen chloride. However, the hydrogen chloride concentration of the hydrochloric acid I and the process conditions of the quenching and absorption step c) are such that hydrogen chloride is not separated off completely from the product gas stream b3 but remains partly in the gas stream c leaving the phase contact apparatus. The presence of hydrogen chloride in the gas stream c has important advantages in the subsequent chlorine distillation (step g)). At least 5%, generally from 5 to 80%, preferably from 10 to 60% and particularly preferably from 15 to 40%, of the hydrogen chloride comprised in the product gas stream b3 remains in the gas stream c.

The hydrochloric acid I preferably has a hydrogen chloride concentration of from 27 to 35% by weight. The temperature of the hydrochloric acid I in the phase contact apparatus is usually from 0 to 150° C., preferably from 30 to 100° C., and the pressure in the phase contact apparatus is usually from 0.5 to 20 bar, preferably from 1 to 10 bar. The product gas stream b3 can be cooled, for example in a heat exchanger, before it enters the phase contact apparatus.

In a preferred embodiment of the process of the invention, the phase contact apparatus has two stages, with the first stage being a pipe quench apparatus and the second stage being a falling film heat exchanger.

In a specific embodiment of the process of the invention, the phase contact apparatus has the following configuration: the first of two stages is designed as a pipe quench. This comprises vertical tubes, known as the pipes, into which the circulating liquid, in the present case the aqueous hydrochloric acid I, which is present between the tubes, is carried by the gas into the tubes. The cooling circulating liquid is broken up into small droplets in the region of the tops of the quenching tubes. The high turbulence and the large exchange area between gas and liquid results in very good heat and mass transfer. Circulating liquid and gas move in cocurrent. The second, downstream stage is a falling film heat exchanger which is configured as a shell-and-tube apparatus. Reaction gas and circulating liquid (hydrochloric acid) are conveyed in cocurrent through the tubes. The shell-and-tube apparatus is cooled by means of water. A small vessel in which liquid and gas separate is located at the bottom of the apparatus. The liquid is returned to the pipe quench apparatus (first stage) as circulating liquid. In addition, the aqueous hydrochloric acid II obtained in the subsequent hydrochloric acid distillation is fed to the pipe quench.

Before the circulating hydrochloric acid is reintroduced into the pipe quench, it can be cooled in an additional heat exchanger installed upstream of the pipe quench. The reduction in temperature of the hydrochloric acid fed to the pipe quench allows, at the same temperature of the hydrochloric acid leaving the pipe quench, the circulating amount to be reduced. If, in contrast, the additional heat exchanger were to be omitted and instead the outflow temperature of the hydrochloric acid in the falling film heat exchanger were to be reduced too much, an excessively high solubility of hydrogen chloride in the aqueous hydrochloric acid could result. It is also possible to provide a plate heat exchanger instead of a falling film heat exchanger.

In general, the phase contact apparatus is operated using circulating hydrochloric acid I. In a preferred embodiment, at least part of the aqueous hydrochloric acid circulating in the phase contact apparatus, for example from 1 to 20%, is taken off from the phase contact apparatus and subsequently distilled to give gaseous hydrogen chloride and an aqueous hydrochloric acid II which has been depleted in hydrogen chloride, with the hydrogen chloride being recirculated to step b) and at least part of the aqueous hydrochloric acid II being recirculated to the phase contact apparatus.

The hydrochloric acid distillation can be carried out in a plurality of stages. For example, a pressure distillation in which hydrogen chloride is obtained at the top of the column and constant-boiling, dilute hydrochloric acid having a hydrogen chloride content in the range of, for example, 15-22% by weight is obtained at the bottom can be carried out first. The bottom offtake stream from the pressure distillation column is subsequently subjected to a vacuum distillation in which water is obtained at the top of the vacuum distillation column and a more highly concentrated constant-boiling hydrochloric acid having a hydrogen chloride content of, for example, 20-28% by weight is obtained at the bottom of the column. The hydrochloric acid obtained in the pressure distillation and the vacuum distillation can in each case be recirculated partly or in its entirety (as hydrochloric acid II) to the phase contact apparatus and be combined with the circulating liquid.

In a further preferred embodiment, the aqueous hydrochloric acid I taken off from the phase contact apparatus is stripped to make it essentially chlorine-free before the hydrochloric acid distillation is carried out. At least part of the oxygen-comprising stream b2 which is fed to the oxidation zone, which can be fresh oxygen-comprising gas or circulating gas (gas stream f2), is preferably used for this purpose. Stripping can be carried out in a conventional stripping column. The chlorine content of the hydrochloric acid I can be reduced to <100 ppm, preferably <10 ppm, in this way.

Part of the stripped, essentially chlorine-free hydrochloric acid I can be separated off before the hydrochloric acid distillation is carried out and be combined with part of the aqueous hydrochloric acid II obtained in the hydrochloric acid distillation, for example the azeotropic acid from the pressure distillation. In this way, it is possible to produce a chlorine-free, in-specification hydrochloric acid of a particular concentration.

The stripping of the hydrochloric acid I to free it of chlorine has the additional advantage that any downstream heat exchanger in which the hydrochloric acid is heated before the distillation does not have to be made of an expensive corrosion-resistant material such as tantalum but can be made of an inexpensive material such as graphite.

The gas stream c leaving the phase contact apparatus comprises chlorine, hydrogen chloride, water, oxygen, carbon dioxide and generally also inert gases (mainly nitrogen if air is used as oxygen-comprising gas). This can be freed of traces of moisture by brining it into contact with suitable desiccants in a subsequent drying step d). Suitable desiccants are, for example, concentrated sulfuric acid, molecular sieves or hygroscopic adsorbents. A gas stream d which is substantially free of water and comprises chlorine, oxygen, carbon dioxide and possibly inert gases is obtained.

Before the drying step d), the gas stream c is generally cooled. The presence of hydrogen chloride results in chlorine not being able to crystallize out as chlorine hydrate at temperatures of <10° C., since the water comprised in the gas stream c is bound in the form of hydrochloric acid. It is therefore possible to cool to lower temperatures, for example from −20 to 5° C., than would be possible in the absence of hydrogen chloride in the stream c. Since the hydrochloric acid which condenses out during cooling has only a low water vapor pressure, the cooled stream c fed to the drying step d) has only a low water content. This is not unimportant for the subsequent drying step since it results in less desiccant, for example concentrated sulfuric acid, being consumed.

In a step e), the gas stream c or d is at least partly liquefied by compression and cooling. In general, the two streams are combined and compressed by means of single-stage or multistage compression to a pressure in the range from 5 to 50 bar and simultaneously cooled by means of single-stage or multistage cooling to a temperature in the range from 0 to −70° C. The streams can also be compressed and cooled separately, in which case one or more separately liquefied streams e can result.

In a subsequent gas/liquid separation f), the stream e is separated into a gas steam f1 comprising chlorine, oxygen, carbon dioxide and possibly inert gases and a liquid stream f2 comprising chlorine, hydrogen chloride, oxygen and carbon dioxide. This step is also referred to as "flash". The phase separation can be carried out by allowing the gas phase to separate from the liquid phase in a simple vessel. In a preferred embodiment, the gas/liquid separation is effected by introducing the compressed stream e into a column at the top and passing it through the column in countercurrent to the ascending gas phase and feeding part of the chlorine-rich liquid phase leaving the bottom of the column back into the top of the column and thus circulating part of this stream. Preference is given to from 0 to 80% by weight of the chlorine-rich liquid stream taken off at the bottom of the column being circulated, i.e. preferably returned to the column at the top. Carbon dioxide comprised in the ascending gas stream is dissolved out of the gas stream and can later be separated from chlorine without problems by distillation (together with remaining oxygen). This results in a gas stream f1 which is low in carbon dioxide and can be at least partly recirculated to the oxidation zone. Thus, the substream which is separated off as purge gas stream from the stream f1 recirculated to the oxidation zone and is discharged from the process in order to prevent accumulation of carbon dioxide can remain comparatively small or be dispensed with altogether, as a result of which the loss of chlorine via the purge gas stream is also limited.

The gas stream f1 which has been separated off generally comprises from 1 to 40% by weight of chlorine, from 1 to 40% by weight of hydrogen chloride, from 1 to 80% by weight of oxygen, from 1 to 80% by weight of nitrogen, from 0 to 30% by weight of carbon dioxide and from 0 to 10% by weight of further constituents such as noble gases and carbon monoxide.

The liquid stream f2 generally comprises from 70 to 98% by weight of chlorine, from 1 to 20% by weight of hydrogen chloride, from 0 to 5% by weight of oxygen, from 0 to 30% by weight of carbon dioxide and from 0 to 5% by weight of further constituents such as noble gases and carbon monoxide.

In a step g), the liquid stream f2 is separated into a chlorine stream g1 and a stream g2 consisting essentially of hydrogen chloride, oxygen and carbon dioxide by distillation in a column, with part of the hydrogen chloride being condensed at the top of the column and running back as runback into the column, as a result of which a stream g2 having a chlorine content of <1% by weight is obtained.

The distillation is generally carried out in a distillation column having, for example, from 5 to 30 theoretical plates at a temperature in the range from −50° C. to +110° C. and a pressure in the range from 4 to 40 bar. The chlorine stream g1 obtained in this way generally has a chlorine content of from 95 to 100% by weight, preferably from 98 to 100% by weight, particularly preferably from 99 to 100% by weight. The stream g2 which consists essentially of hydrogen chloride, oxygen and carbon dioxide is discharged from the process as offgas stream.

The hydrogen chloride which has been liquefied with the chlorine allows, when returned as runback from the overhead condenser, virtually complete retention of the chlorine which consequently does not go into the offgas and become lost as product of value. A higher overhead temperature of the chlorine distillation column is also possible as a result of the hydrogen chloride reflux.

In one embodiment of the process of the invention, a hydrogen chloride stream is taken off as liquid side offtake stream from the chlorine distillation column and is recirculated to the oxidation zone. This stream can, after depressurization to reactor pressure, serve as coolant in a heat integration apparatus.

In an optional step h), the gas stream g2 is brought into contact with aqueous hydrochloric acid, preferably the hydrochloric acid II obtained by pressure distillation or vacuum distillation, in a phase contact apparatus and hydrogen chloride is separated off from the stream g2 to leave a gas stream h which consists essentially of oxygen and carbon dioxide and further comprises small amounts of hydrogen chloride and chlorine. In general, the hydrogen chloride content of the stream g is from 100 to 10000 ppm and the chlorine content is from 10 to 100 ppm. Since the major part of the inert gases including oxygen has been separated off in the gas/liquid separation step f, only a comparatively small gas volume stream is obtained in the absorption step h, so that a small absorption column is sufficient for the hydrogen chloride separation.

In a further optional step i), the gas stream h is brought into contact with a solution comprising sodium hydrogencarbonate and sodium hydrogensulfite and having a pH of from 7 to 9, resulting in chlorine and hydrogen chloride being removed from the gas stream h.

The offgas stream h is preferably brought into contact with a circulating pump stream comprising sodium hydrogencarbonate and sodiumhydrogen sulfite and having a pH of from about 7.0 to 9.0 in a scrubbing column. The circulating pump stream is introduced at the top of a scrubbing column. Here, essentially the following (equilibrium) reactions take place:

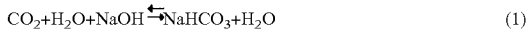

$$CO_2 + H_2O + NaOH \rightleftarrows NaHCO_3 + H_2O \quad (1)$$

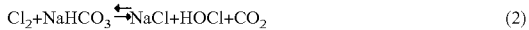

$$Cl_2 + NaHCO_3 \rightleftarrows NaCl + HOCl + CO_2 \quad (2)$$

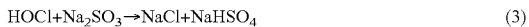

$$HOCl + Na_2SO_3 \rightarrow NaCl + NaHSO_4 \quad (3)$$

Part of the bottom offtake stream comprising NaCl, $NaHSO_4/Na_2SO_4$, $NaHSO_3/Na_2SO_3$ and $NaHCO_3$ is discharged. The circulating pump stream is supplemented with alkaline aqueous sodium sulfite solution. Since only a little carbon dioxide is bound by means of this mode of operation, the scrubbing step i) consumes comparatively little NaOH.

The invention is illustrated with the aid of the drawings.

FIGS. 1 to 6 show schematic flow diagrams of one variant of the adsorption/regeneration cycle according to the invention in which regeneration of the adsorbers is effected by means of circulating gas. The arrangement shown in FIGS. 1 to 6 comprises a first adsorber 4, a second adsorber 5, a compressor 11, a heater 6, a cooler and condenser 7, a phase separator 8, a receiver 9, a pump 10 and also lines which can be opened and closed by means of valves, including a fresh HCl feedline 1, an HCl discharge line 2 and a (chloro)hydrocarbon discharge line 3. The adsorbers which are in adsorption operation are hatched, and the adsorbers which are in regeneration operation are shown without a pattern.

FIG. 1 illustrates step i) of the process of the invention. The first adsorber 4 and the second adsorber 5 are connected in series and the fresh hydrogen chloride 1 passes in succession through the two adsorbers until the first adsorber 4 is essentially fully laden with (chloro)hydrocarbon and essentially no more (chloro)hydrocarbon is adsorbed and all of the phosgene has thus been displaced from the first adsorber stage and is present in the second adsorber 5.

Figure 2:
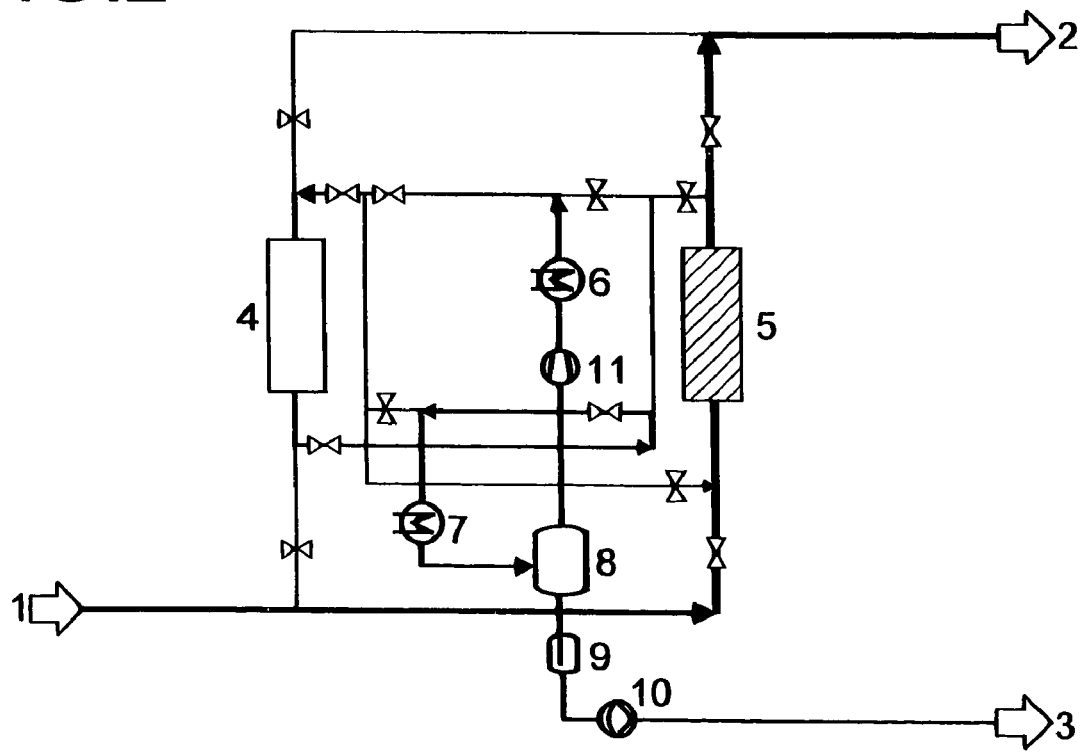
FIG. 2 illustrates step iia) of the process of the invention with circulating gas regeneration.

FIG. 2 illustrates step iia) of the process of the invention with circulating gas regeneration. The fresh hydrogen chloride is now passed through only the second adsorber 5 while the first adsorber 4 is regenerated. The hydrogen chloride comprised in the first adsorber 4 is passed by means of the compressor 11 through the heater 6, the adsorber 4 and subsequently through the condenser 7 and the phase separator 8. During this step, the (chloro)hydrocarbon is desorbed from the adsorption bed by means of the heated hydrogen chloride stream and is taken up by the latter. Liquid, essentially phosgene-free (chloro)hydrocarbon condenses out from the (chloro)hydrocarbon-laden hydrogen chloride stream in the condenser 7 and is separated from the gas stream in the phase separator 8 and discharged via the receiver 9 as stream 10. The direction of the gas stream passing through the adsorber 4 is opposite to that in the adsorption step.

Figure 3:
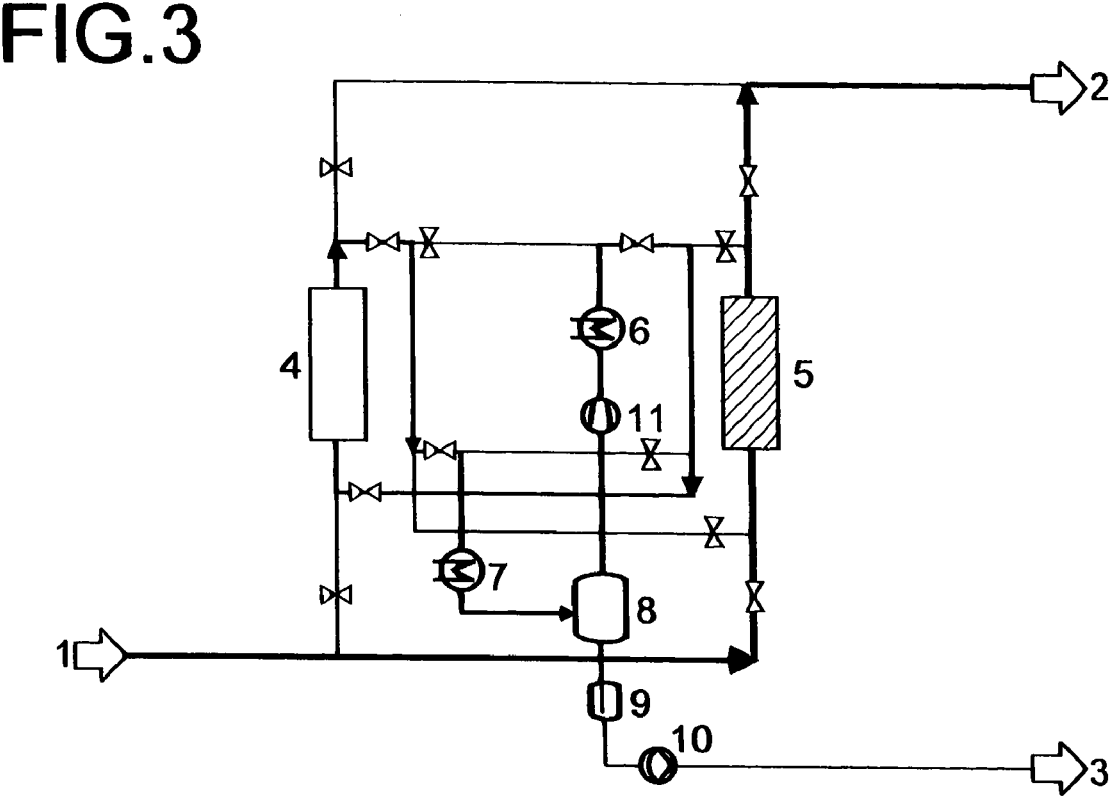
FIG. 3 illustrates step iib) of the process of the invention with circulating gas regeneration.

FIG. 3 illustrates step iib) of the process of the invention with circulating gas regeneration. The heater 6 is now not in operation, so that the circulating gas stream is no longer heated but instead is now only cooled by the cooler/condenser 7. The gas direction through the adsorber 4 has been reversed again and now once again corresponds to the gas direction in adsorption operation.

Figure 4:
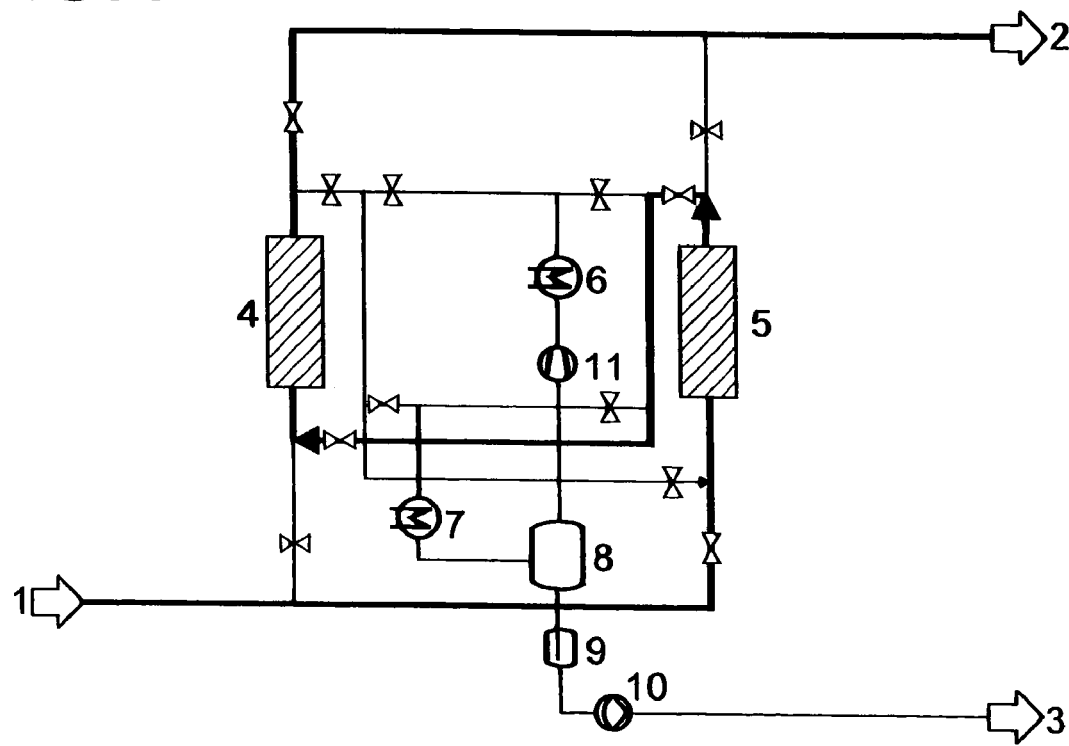
FIG. 4 illustrates step iii) of the process of the invention.

FIG. 4 illustrates step iii) of the process of the invention. Step iii) corresponds to step i) (FIG. 1) except that the order of the adsorbers 4 and 5 has been exchanged compared to step i). Adsorber 5 is laden until essentially no more (chloro)hydrocarbon is adsorbed and the total amount of phosgene has consequently been displaced from this adsorber. The phosgene is now present in the downstream adsorber 4 or has been, while the adsorber 4 was in regeneration operation (as shown in FIG. 3), at least partly displaced from the absorber 5 and goes together with stream 2 to the downstream hydrogen chloride oxidation process.

Figure 5:
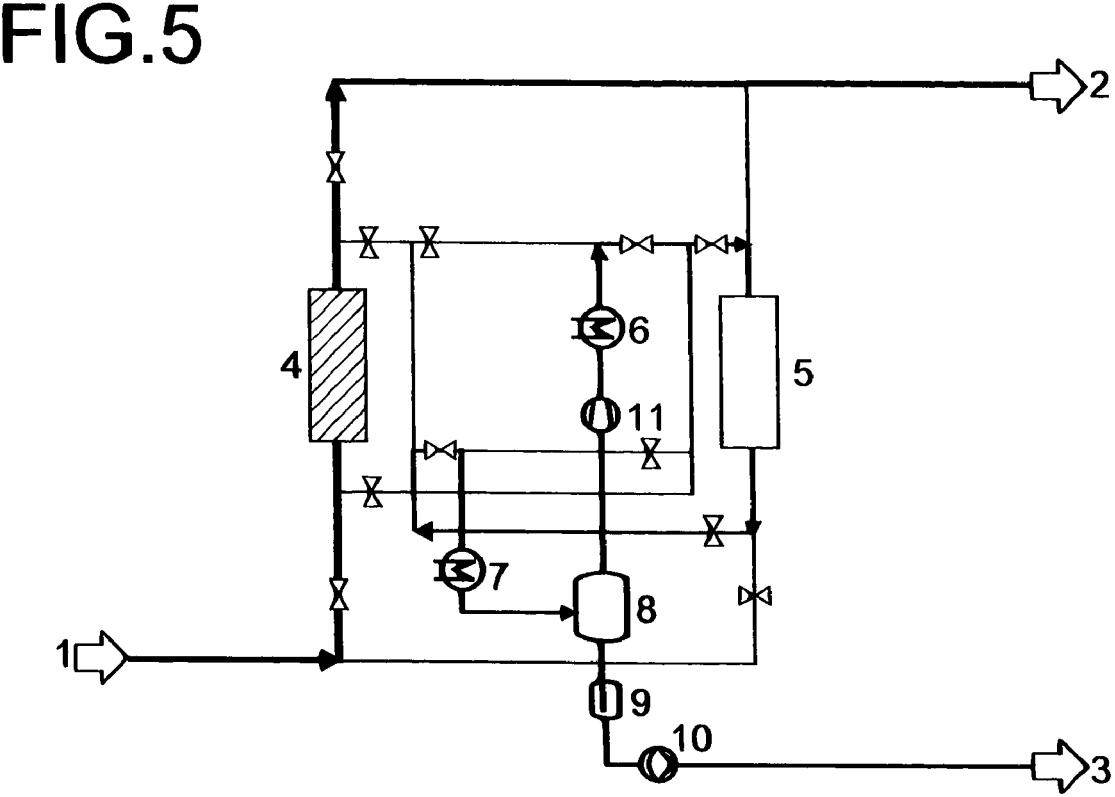
FIG. 5 illustrates step iva) of the process of the invention with circulating gas regeneration.

FIG. 5 illustrates step iva) of the process of the invention with circulating gas regeneration. The step iva) corresponds to the step iia) (FIG. 2), with the adsorber 5 now being in regeneration operation.

Figure 6:
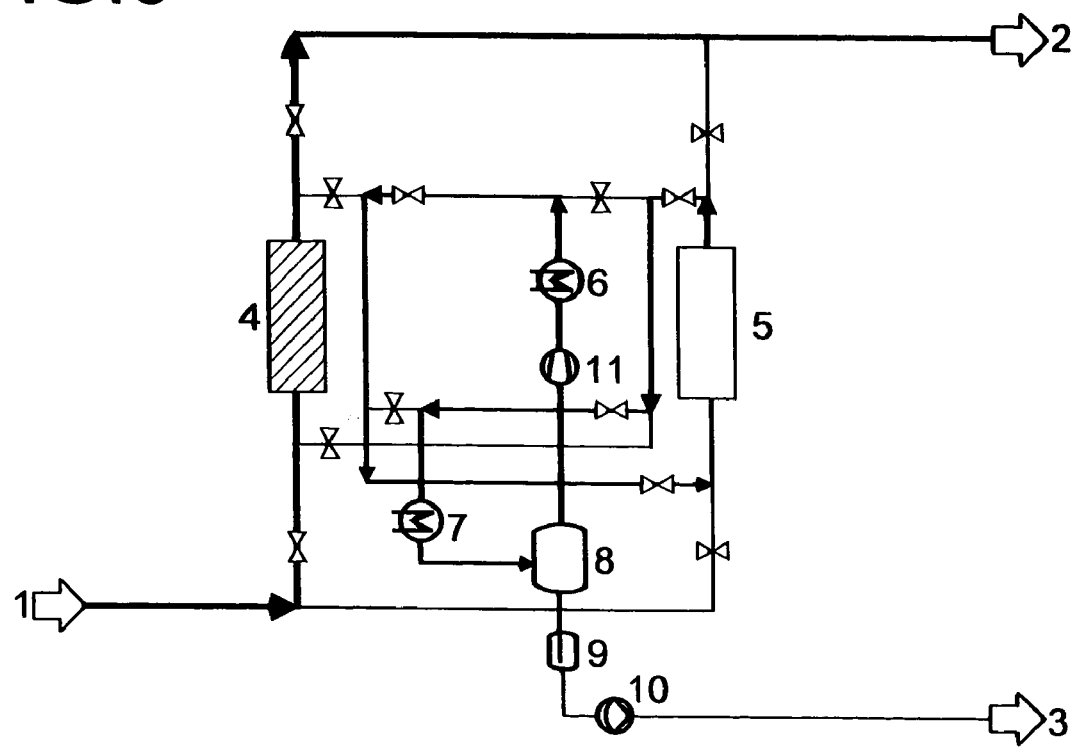
FIG. 6 illustrates step ivb) of the process of the invention with circulating gas regeneration.

FIG. 6 illustrates step ivb) of the process of the invention with circulating gas regeneration. The step ivb) corresponds to the step iib) (FIG. 3), with the adsorber 5 being in regeneration operation. Step ivb) completes the cycle. The next step once again corresponds to step i) (FIG. 1).

FIGS. 7 to 12 show schematic flow diagrams of a variant of the adsorption/regeneration cycle according to the invention in which regeneration of the adsorbers is carried out using fresh hydrogen chloride gas. The arrangement shown in the figures comprises the first adsorber 4, the second adsorber 5, the heater 6, the cooler and condenser 7, the phase separator 8, the receiver 9, the pump 10 and lines which can be opened and closed by means of valves, including a fresh HCl feedline 1, an HCl discharge line 2 and a (chloro)hydrocarbon discharge line 3. The compressor 11 is omitted.

Figure 7:
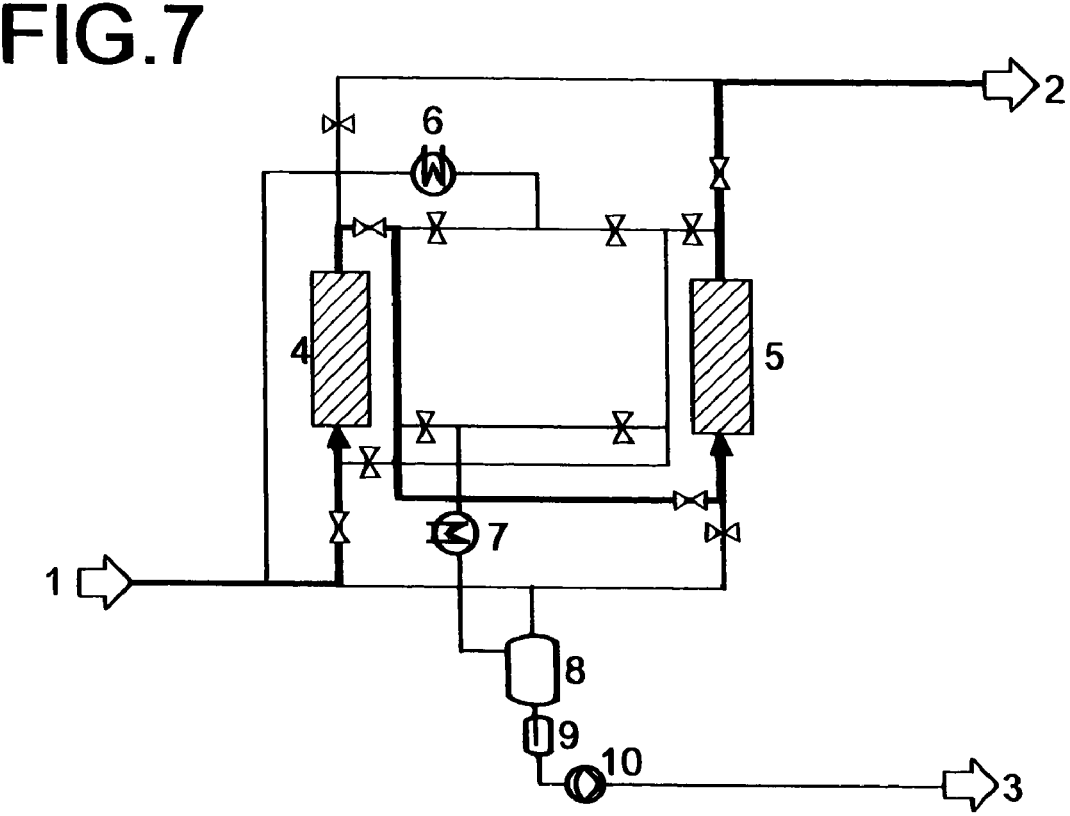
FIG. 7 illustrates the loading of the adsorbers 4 and 5 connected in series, corresponding to FIG. 1.

FIG. 7 illustrates the loading of the adsorbers 4 and 5 connected in series, corresponding to FIG. 1.

Figure 8:
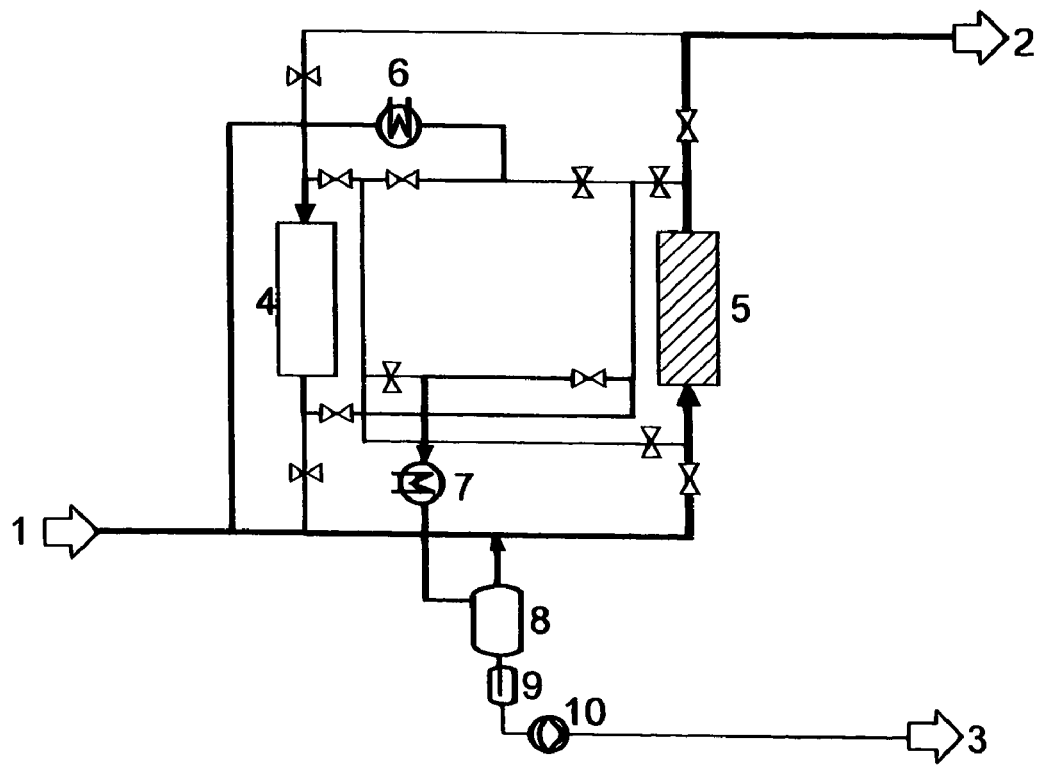
FIG. 8 illustrates step iia) of the process of the invention with fresh gas regeneration.

FIG. 8 illustrates step iia) of the process of the invention with fresh gas regeneration. The fresh hydrogen chloride stream is now passed only through the second adsorber 5 while the first adsorber 4 is regenerated. For this purpose, a substream is taken from the fresh hydrogen chloride stream 1 and passed through the heater 6, the adsorber 4, the condenser 7 and the phase separator 8. The direction of the gas passing through the adsorber 4 is opposite to that in the adsorption step. The substream passes through the phase separator 8 and is subsequently combined again with the main stream.

Figure 9:
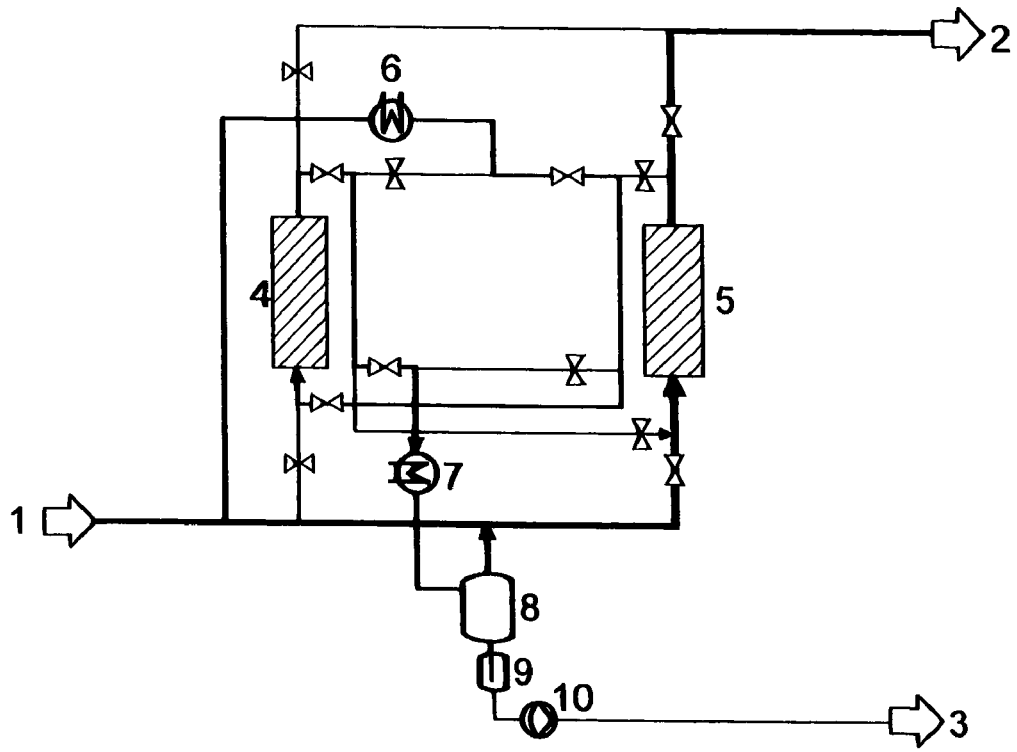
FIG. 9 illustrates step iib) of the process of the invention with fresh gas regeneration.

FIG. 9 illustrates step iib) of the process of the invention with fresh gas regeneration. The heater 6 is not in operation, so that the circulating gas stream is no longer heated. The gas direction through the adsorber 4 is reversed again and now corresponds to the gas direction in adsorption operation.

Figure 10:
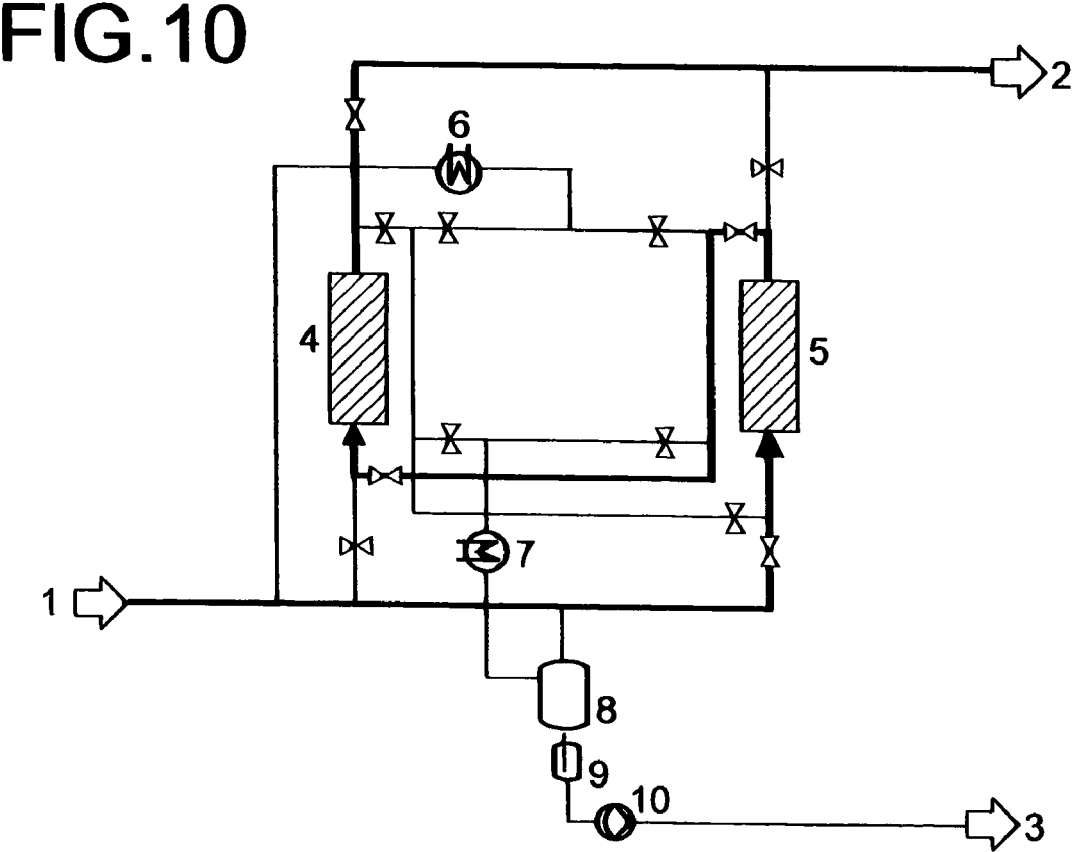
FIG. 10 illustrates step iii) of the process of the invention and corresponds essentially to FIG. 4.

FIG. 10 illustrates step iii) of the process of the invention and corresponds essentially to FIG. 4. The order of the adsorbers 4 and 5 is now exchanged compared to step i).

Figure 11:
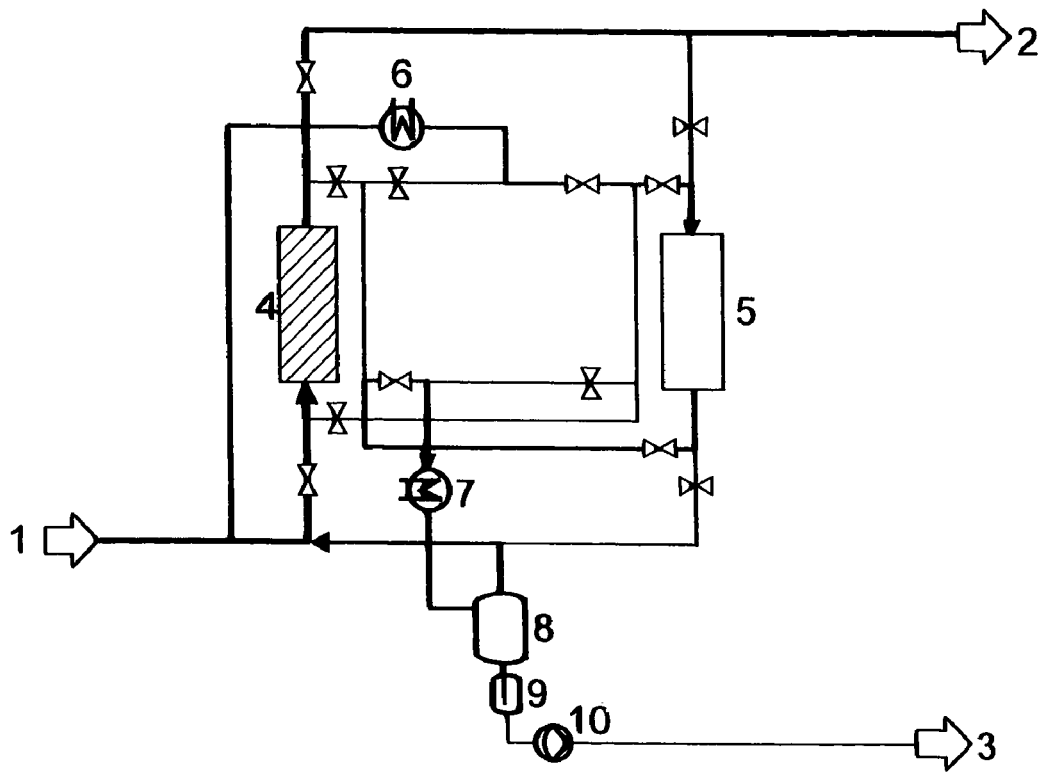
FIG. 11 illustrates step iva) of the process of the invention with fresh gas regeneration.

FIG. 11 illustrates step iva) of the process of the invention with fresh gas regeneration. The step iva) corresponds to step iia) (FIG. 8) with the adsorber 5 now being in regeneration operation.

Figure 12:
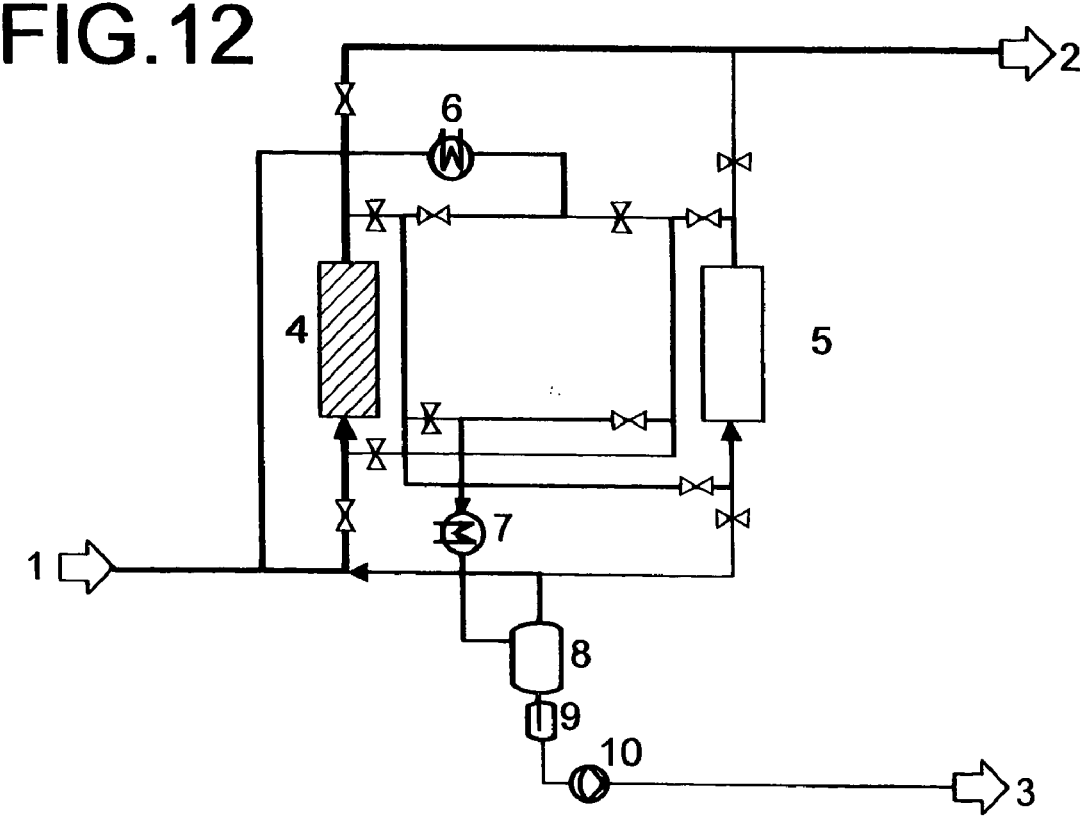
FIG. 12 illustrates step ivb) of the process of the invention with fresh gas regeneration.

FIG. 12 illustrates step ivb) of the process of the invention with fresh gas regeneration. The step ivb) corresponds to step iib) (FIG. 9), with the adsorber 5 being in regeneration operation. Step ivb) completes the cycle. The next step once again corresponds to step i) (FIG. 7).

The invention claimed is:

1. A process for recovering (chloro)hydrocarbon-free hydrogen chloride and phosgene-free (chloro)hydrocarbons from a hydrogen chloride stream comprising (chloro)hydrocarbons and phosgene, which comprises
   i) in a first step, connecting a first adsorber and a second adsorber in series and passing the fresh hydrogen chloride stream comprising phosgene and (chloro)hydrocarbons firstly through the first adsorber and subsequently through the second adsorber until essentially no more (chloro)hydrocarbon is adsorbed by the first adsorber,
   ii) in a second step, passing the fresh hydrogen chloride stream through the second adsorber while the first adsorber is regenerated, with essentially phosgene-free (chloro)hydrocarbon being obtained in the regeneration, iii) in a third step, passing the fresh hydrogen chloride stream firstly through the second adsorber and subsequently through the regenerated first adsorber until essentially no more (chloro)hydrocarbon is adsorbed by the second adsorber, and (iv) in a fourth step, passing the fresh hydrogen chloride stream through the first adsorber while the second adsorber is regenerated, with essentially phosgene-free (chloro)hydrocarbon being obtained in the regeneration, with the steps i) to iv) being able to be carried out one or more times in succession.

2. The process according to claim 1, wherein the hydrogen chloride comprised in the respective adsorber is passed as circulating gas in a closed circuit comprising a compressor, a heater, a condenser and a phase separator over the adsorber bed in the regeneration steps ii) and/or iv), with the circulating hydrogen chloride gas stream being heated before it enters the adsorber bed and being cooled after it leaves the adsorber bed, with liquid, essentially phosgene-free (chloro)hydrocarbon being recovered in the condenser and phase separator.

3. The process according to claim 2, wherein the circulating hydrogen chloride gas stream is heated before it enters the adsorber bed and is cooled after it leaves the adsorber bed in a first step iia) or iva) and the circulating hydrogen chloride gas stream is only cooled in a second step iib) or ivb), with liquid, essentially phosgene-free chlorohydrocarbon being obtained in the condenser and phase separator.

4. The process according to claim 3, wherein, in the regeneration steps ii) and/or iv), the circulating gas is passed over the adsorber bed in the opposite direction compared to the adsorption step i) or iii) and the direction of the circulating gas steam is reversed again between the steps iia) and iib) or iva) and ivb).

5. The process according to claim 1, wherein, in the regeneration steps ii) and/or iv), at least a substream of the fresh hydrogen chloride stream is branched off, heated, passed through the adsorber bed to be regenerated and subsequently through a condenser and a phase separator, with liquid, essentially phosgene-free (chloro)hydrocarbon being recovered, and subsequently, optionally after combining this substream with the main stream of the fresh hydrogen chloride, passed through the other adsorber which is in adsorption operation.

6. The process according to claim 5, wherein the substream is heated before it enters the adsorber bed and is cooled after it leaves the adsorber bed in a first step iia) or iva) and the substream is no longer heated in a second step iib) or ivb), with liquid, essentially phosgene-free (chloro)hydrocarbon being obtained in the condenser and phase separator.

7. A process for preparing chlorine from hydrogen chloride comprising (chloro)hydrocarbons and phosgene, which comprises the steps:
a) purification of a stream a comprising hydrogen chloride, (chloro)hydrocarbons and phosgene by the process according to claim 1 to give phosgene-free (chloro)hydrocarbons and an essentially (chloro)hydrocarbon-free, HCl-comprising feed gas stream b1;
b) introduction of the HCl-comprising stream b1 and an oxygen-comprising stream b2 into an oxidation zone and catalytic oxidation of hydrogen chloride to chlorine to give a product gas stream b3 comprising chlorine, hydrogen chloride, water, oxygen, carbon dioxide and inert gases;
c) contacting of the product gas stream b3 with aqueous hydrochloric acid I in a phase contact apparatus and partial removal of water and hydrogen chloride from the stream b3 to leave a gas stream c comprising hydrogen chloride, chlorine, water, oxygen, carbon dioxide and possibly inert gases, with at least 5% of the hydrogen chloride comprised in the stream b3 remaining in the gas stream c;
d) optional drying of the gas stream c to leave an essentially water-free gas stream d comprising hydrogen chloride, chlorine, oxygen, carbon dioxide and possibly inert gases;
e) partial liquefaction of the gas stream d by compression and cooling to give an at least partially liquefied stream e;
f) gas/liquid separation of the stream e to give a gas stream f1 comprising chlorine, oxygen, carbon dioxide and possibly inert gases and a liquid stream f2 comprising hydrogen chloride, chlorine, oxygen and carbon dioxide and, optionally, recirculation of at least part of the gas stream f1 to step b); and
g) separation of the liquid stream f2 by distillation in a column to give a chlorine stream g1 and a stream g2 consisting essentially of hydrogen chloride, oxygen and carbon dioxide, with part of the hydrogen chloride condensing at the top of the column and running back as runback into the column, as a result of which a stream g2 having a chlorine content of <1% by weight is obtained.

* * * * *